United States Patent [19]

Haegele et al.

[11] 4,258,584

[45] Mar. 31, 1981

[54] BALL CIRCULATION SCREW GEAR

[75] Inventors: Gerhard Haegele, Hohenstadt; Helmut Knoedler, Schwabisch Gmund, both of Fed. Rep. of Germany

[73] Assignee: Zahnradfabrik Friedrichshafen, AG., Friedrichshafen, Fed. Rep. of Germany

[21] Appl. No.: 941,662

[22] Filed: Sep. 12, 1978

[30] Foreign Application Priority Data

Sep. 14, 1977 [DE] Fed. Rep. of Germany ....... 2741333

[51] Int. Cl.³ ............................................. F16H 29/20
[52] U.S. Cl. ............................... 74/424.8 R; 74/89.15
[58] Field of Search ................... 74/424.8 R, 424.8 A, 74/424.8 B, 424.8 UA, 424.8 UZ, 89.15, 216.3

[56] References Cited

U.S. PATENT DOCUMENTS

| 2,895,343 | 7/1959 | Ovuer | 74/424.8 R |
| 2,990,157 | 6/1961 | McGuire | 74/424.8 R |
| 3,161,073 | 12/1964 | Deutsch et al. | 74/424.8 R |
| 3,333,484 | 8/1967 | Young | 74/424.8 R |
| 3,924,486 | 12/1975 | Taillardat | 74/424.8 R |
| 3,971,264 | 7/1976 | Detvaz | 74/424.8 R |

FOREIGN PATENT DOCUMENTS

| 2451665 | 5/1975 | Fed. Rep. of Germany | 74/424.8 R |
| 932721 | 7/1963 | United Kingdom | 74/424.8 R |

*Primary Examiner*—C. J. Husar
*Assistant Examiner*—Conrad Berman
*Attorney, Agent, or Firm*—Zalkind & Shuster

[57] ABSTRACT

A worm gear is provided having a rotary worm screw which drives a reciprocal ball nut by means of a ball chain with coacting helical channeling effecting a raceway between the worm screw and ball nut. The invention resides in providing a ball return member in the interior of the worm screw such that a smaller number of balls in the ball chain may be used than has heretofore been possible in the prior art, and wherein friction is substantially reduced by the use of a smaller ball return channel in a median plane of the ball return member connecting at its ends with radial inlet and outlet channels. A considerable reduction in friction is achieved by the use of novel plastic bushings at the entrance and exit openings into the ball return member which greatly reduces the wear on the components.

10 Claims, 8 Drawing Figures

BALL CIRCULATION SCREW GEAR

In general, the invention is of the ball circulation type described in German Patent OS No. 2 451 665, useable in motor vehicle steering systems and in braking mechanisms.

In the prior art, a ball return channel is provided helically on a ball return member and at the inlet thereto of balls in a moving ball chain. A direction reversal element is disposed to facilitate deflection of the balls. In such constructions to prevent the angle of deflection from becoming too steep and thus causing great wear and difficulty of operation, the ball chain is routed into the interior of the worm screw eccentrically and essentially tangentially to the ball return member. However, such place of entry has a sharp edge and difficulties arise as a result of the helicity where there is a large pitch of the ball circulation channel in the course of directing the ball chain to the interior of the worm screw. In addition to considerable wear and difficulty of operation, such constructions are relatively expensive in production.

The present invention overcomes the above drawbacks in providing a readily operable and simply constructed worm gear which experiences little wear and little friction in the moving parts. A particularly novel feature of the invention is the provision of a ball return member within the worm screw having a ball return channel which is located in the median plane of the member and which is the central portion of the ball return raceway, wherein the other portions are an inlet and an outlet channel continuing from the ends of the median plane channel. Thus, the median plane channel is essentially coaxial with the ball return member and the inlet and outlet channels are radial with respect to the axis of the ball return member.

In particular, a feature of the invention resides in the provision of a bushing at the opening of the inlet and outlet channels in the ball return member to guide balls to and from such channels in their movement between the worm screw and the ball nut. Such bushings are preferably of plastic or bearing metal or the like, and serve to deflect the balls from the peripheral groove of the screw into the interior of the ball return member as well as outwardly therefrom in the course of ball chain circulation. The above described construction provides a continuous path of the ball chain by the shortest route and with a smaller number of balls than heretofore possible, facilitating the ready movement of the balls and reducing wear.

The above described features would appear to have been a theoretical possibility and desirable hitherto, but has not been done because of the sharp deflecting path of the balls upon entry into the interior of the ball return member mainly involving an angle of 90°. Thus, movement of the balls would have been very difficult if not impractical and wear on them would have been very high. Thus, the theoretical possibility, even if conjectured, could not have been realized as a practical matter. However, the arrangement is made possible by the teaching of the present invention wherein the balls are smoothly guided, without being sharply deflected, by the relatively low friction material bushing as part of the raceway and are supported throughout the changing directions in passing to and from the median plane of the ball return member. The curving travel is thus gentle and on a longer path than would otherwise be possible.

This results in a ball chain requiring fewer balls since the balls can move in longer paths precisely at points of turning of the raceway between the worm screw and the ball nut yet with no need to increase the transition paths in these areas as required by the prior art. The invention is susceptible to ball return constructions for double ball chains as well, and preferably the inlet and outlet channels as well as the central channel are all in the same median plane of the ball return member thereby resulting in an improved ball bearing arrangement for worm gears.

A further advantage inherent in the invention is the fact that a ball return raceway with 1.5, 2.5, 3.5 turn threads are readily obtainable due to an S-shaped configuration of the composite channel path in the ball return member. Where the composite channel in the ball return member is U-shaped, then circulation turns of 2, 3, 4 or higher whole-number turns are possible. The construction of the ball return member is very simple comprising a generally cylindrical peripherally ribbed body consisting of two half portions wherein each half of a ball channel is provided so that when the half portions are assembled, a solid body with a ball channel running therethrough is effected in the median plane, i.e., the plane of juncture.

A detailed description of the invention now follows in conjunction with the appended drawing in which.

The combination comprises a worm screw 1 having a helical channel carrying balls 2 of a ball chain and which channel forms a raceway for the balls in coaction with a helical channel of a ball nut 3 in the usual manner. Accordingly, it will be understood that rotation of worm screw 1 effects reciprocation axially of ball nut 3.

Figure 1:
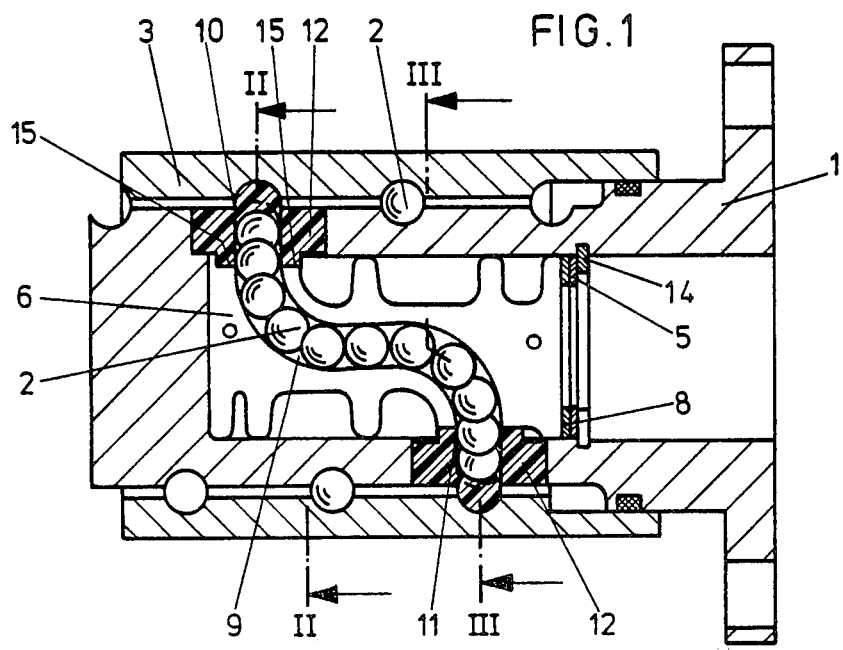
FIG. 1 is a longitudinal section showing the essential components for an S-shaped raceway.

A ball return member 4 is disposed internally of the worm screw and is a generally cylindrical shape supported by radial flanges and ribs as shown, being comprised of two half portions 6 and 7 of a preferably plastic material which may be secured to each other as by doweling, gluing or welding. As illustrated in FIG. 1 the median plane or wall of a half portion is shown illustrating a composite raceway explained in detail subsequently. The assembled ball return member 4 is axially fixed as by a dish spring 5 acting against a washer 8 contiguous with the end face of member 4 and the assembly locked in place as by a split washer 14.

Figure 2:
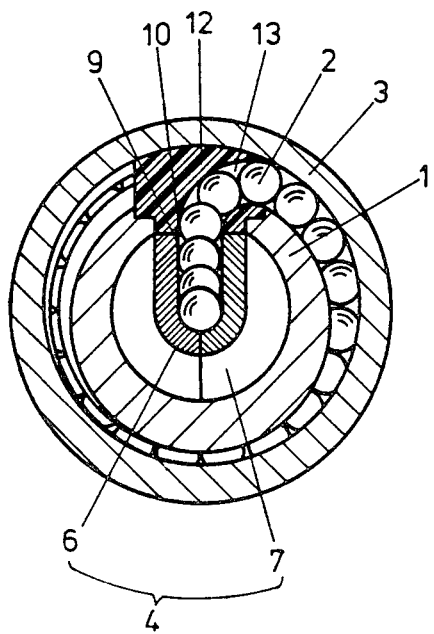
FIG. 2 is a section II—II of FIG. 1.
Figure 3:
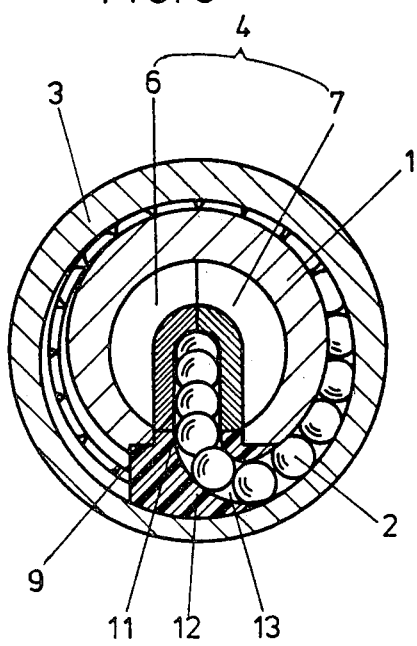
FIG. 3 is a section III—III of FIG. 1.

As seen in FIG. 1 this portion of the raceway is S-shaped in the channel 9 which is a channel in the median plane of the ball return member 4 and includes channels through an inlet bore 10 and an outlet bore 11 in turn coaxial with channels in inlet and outlet bushings 12, such channels being in each case designated by the reference numeral 13 as seen in FIGS. 2 and 3. A study of the raceway thus effected shows smooth transition of ball movement through one bushing channel 13 and then through channel 9 and finally through the other bushing channel 13, the direction of movement of the balls being dependent on direction of rotation of worm screw 1.

It is important to note that the transition is accomplished smoothly in that all channels shown in FIG. 1 are in the median plane of the ball return member 4 and as seen in FIGS. 2 and 3 the ball movement can progress smoothly in or out of a channel 13 to move into or out of the raceway section between the worm screw 1 and the ball nut 3 in a continuous ball chain.

Such movement is provided for gently and in a large passage angle through the bushings with no sharp corners or edges.

Since the bushings are preferably made of plastic or bearing metal, low friction of ball motion results. Thus, the balls feed to or from the bushings from the circumferential to a radial path eased around a corner as will be clear from FIGS. 2 and 3.

Where the drive ratio of the device is in whole numbers the inlet and outlet openings of the ball return member 4 would be on the same side so that it would be U-shaped. The S-shaped channel shown in FIG. 1 would provide a drive ratio intermediate whole numbers, as heretofore described.

The ball return member is radially stabilized within the worm screw by providing projecting integral arcuate guide formations as seen in FIGS. 2 and 3 which project into the channel of ball nut 3 while the bushings themselves are secured in sockets 15 of the ball nut member 4 by provision of radially extending bosses of the bushings accomodated in such sockets.

Figure 5:
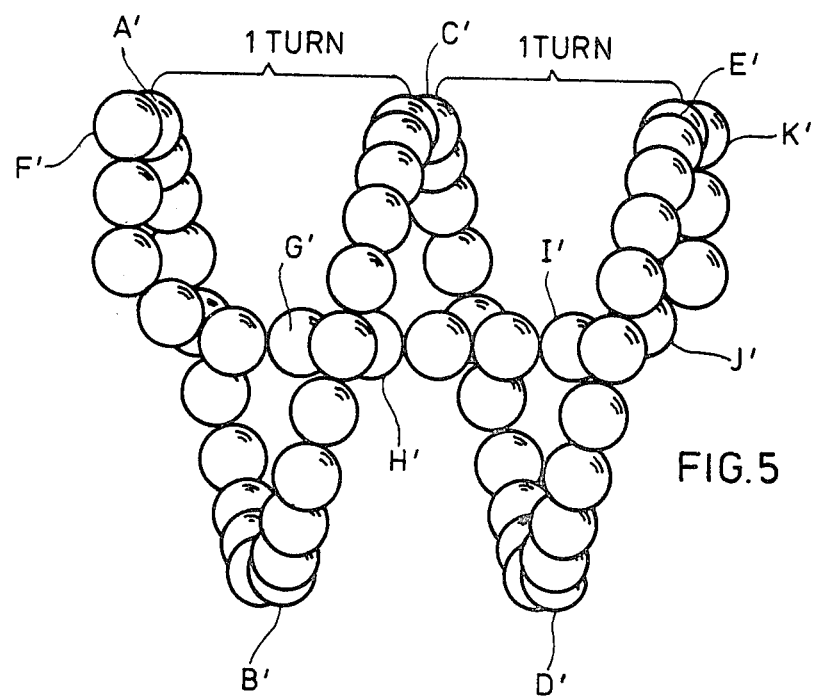
FIG. 5 is a skeletonized representation of the balls in a "U" shaped raceway.
Figure 4:
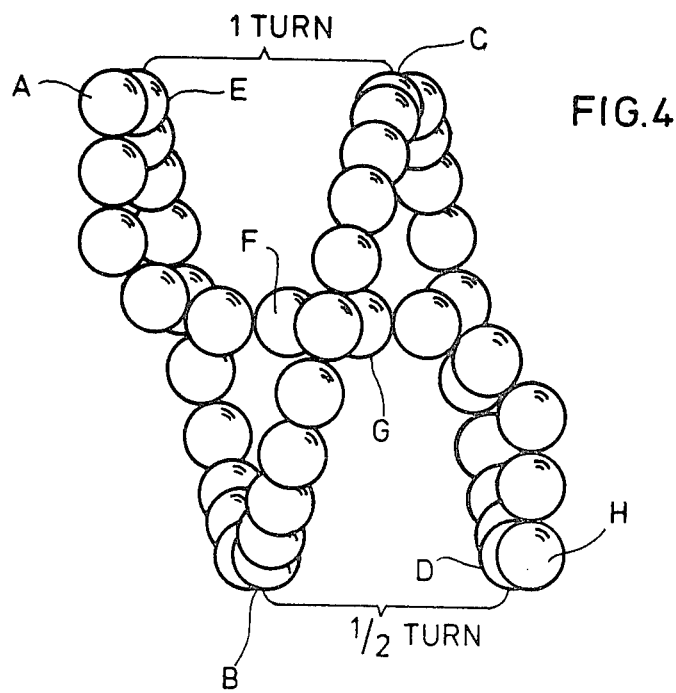
FIG. 4 is a skeletonized presentation of the configuration of balls in an "S" shaped raceway.

The advantages of the invention from a standpoint of avoiding friction and a smaller number of balls in the chain will be apparent by comparison of the above disclosure with FIGS. 2, 4 and 5 of German Patent OS No. 2 451 665 showing the sharp transition of the raceway. The larger number of balls required is shown in FIGS. 1 and 3.

FIG. 4 showing a skeletonized arrangement of the balls for a one and one-half turn S-shaped raceway in which alphabetical characters are used in order to render convenient a follow-through of the paths. Thus, the S-shaped path is represented by tracing through the letters from the balls identified as E-F-G-H. The return pathways can be followed through by the letters A-B-C-D. Similarly, in FIG. 5, for a U-shaped raceway having two turns, the sequence of letters for the U-shaped path is F'-G'-H'-I'-J'-K'. The return paths are followed through in the sequence A'-B'-C'-D'-E'.

Figure 6:
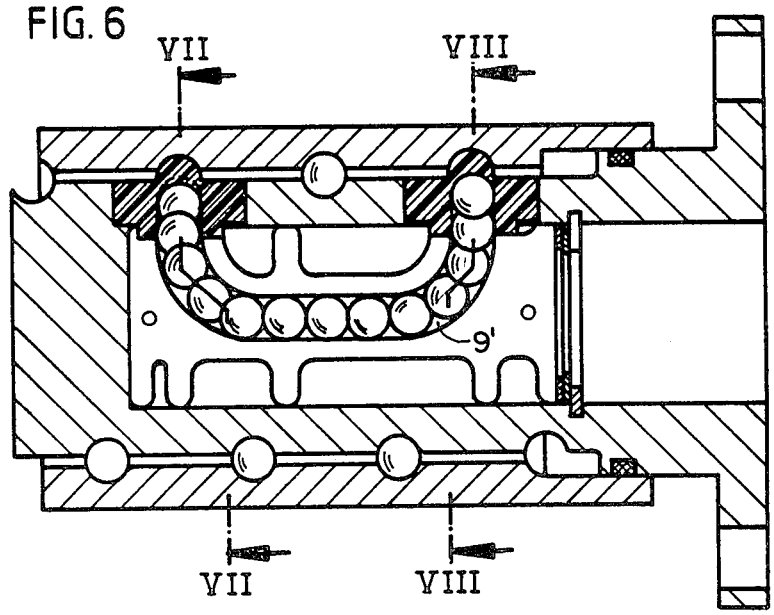
FIG. 6 is a view similar to FIG. 1, showing the essential components for a U-shaped raceway as a longitudinal section.
Figure 7:
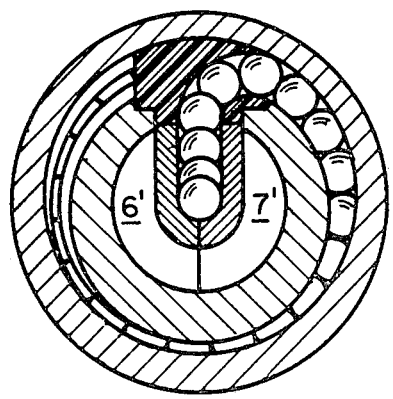
FIG. 7 is a section on the line VII—VII of FIG. 6.
Figure 8:
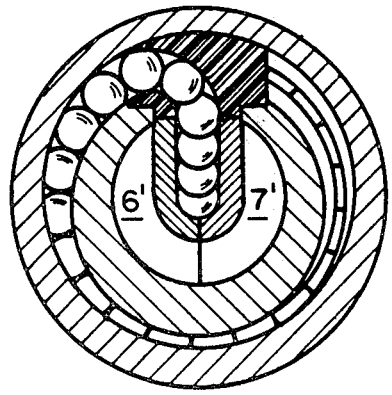
FIG. 8 is a section on the line VIII—VIII of FIG. 6.

Referring to FIG. 6, the structure is identical to FIG. 1 except for the U-shaped channel 9' comprised within the sections 6', 7' of the ball return member.

We claim:

1. In a worm gear of the kind comprising a helically channeled ball nut (3) encompassing a helically circumferentially channeled worm screw (1) and having an intermediate ball chain (2) whereby rotation of said worm screw reciprocates said ball nut;
   the improvement which comprises a ball return member (4) within said worm screw having a raceway for a ball chain comprising radially disposed inlet and outlet channels (10, 11) with openings for connection with respective apertures through said worm screw;
   said raceway comprising a ball chain channel (9) in said ball return member connecting said inlet channel with said outlet channel;
   said raceway being in a median plane of said ball return member;
   including respective ball guide bushings (12) in said return member disposed at said inlet and outlet openings and channeled for transition of ball movement between radial and circumferential channels of said ball return member and said worm screw, respectively.

2. In a worm gear as set forth in claim 1, wherein said raceway is S-shaped.

3. In a worm gear as set forth in claim 1, wherein said raceway is U-shaped.

4. In a worm gear as set forth in claim 1, wherein said ball return member is comprised of plastic material.

5. In a worm gear as set forth in claim 1, wherein said ball return member is provided with sockets at said openings and said bushings are carried in said sockets;
   said bushings extending radially outwardly into the channeling of said ball nut to thereby radially stabilize said ball return member.

6. In a worm gear as set forth in claim 1, each of said bushings being provided with a curved ball channel effecting a turn in direction of movement of balls in said chain in progressing therethrough from and to said worm screw.

7. In a worm gear as set forth in claim 1, wherein said ball return member is comprised of two half portions (6, 7) of a generally cylindrical body and said median plane is in the junction plane of the assembled half portions.

8. In a worm gear as set forth in claim 7, wherein said ball return member is comprised of bearing metal.

9. In a worm gear as set forth in claim 7, wherein said half portions are joined by dowelling.

10. In a worm gear of the kind set forth in claim 7, wherein the half portions are joined by gluing or welding.

* * * * *